United States Patent [19]

Schwartz

[11] 4,168,533

[45] Sep. 18, 1979

[54] MICROCOMPUTERIZED MINIATURE POSTAGE METER

[75] Inventor: Leon J. Schwartz, Monsey, N.Y.

[73] Assignee: Pitney-Bowes, Inc., Stamford, Conn.

[21] Appl. No.: 785,265

[22] Filed: Apr. 6, 1977

Related U.S. Application Data

[63] Continuation-in-part of Ser. No. 649,152, Jan. 14, 1976.

[51] Int. Cl.² .............. G06F 3/12; G01D 15/18; G06F 7/48
[52] U.S. Cl. .................................... 364/900; 346/1; 346/75; 364/705
[58] Field of Search ... 364/200 MS File, 900 MS File, 364/705; 346/1, 75

[56] References Cited

U.S. PATENT DOCUMENTS

| | | | |
|---|---|---|---|
| 3,656,169 | 4/1972 | Kashio | 346/75 X |
| 3,803,628 | 4/1974 | Brimer et al. | 346/75 X |
| 3,816,730 | 6/1974 | Yamamoto et al. | 364/705 |
| 3,869,986 | 3/1975 | Hubbard | 346/75 X |
| 3,911,818 | 10/1975 | MacIlvaine | 346/75 X |

Primary Examiner—Raulfe B. Zache
Attorney, Agent, or Firm—Donald P. Walker; William D. Soltow, Jr.; Albert W. Scribner

[57] ABSTRACT

A microcomputerized, miniature postage meter comprises an ink jet printing device adapted to project ink droplets onto a document. A microcomputer, which performs the control and data processing functions of the meter, includes a logic circuit programmed to actuate the ink jet printing device to project ink droplets on the document in a postage indicia forming pattern. In the preferred form of the postage meter, the ink jet printing device is mounted to be moved in close operative proximity relative to the document and the microcomputer is programmed to sequentially actuate the printing device during this relative movement. The movement of the printing device relative to the document is detected by an encoded rotating wheel mounted on the lower contact surface of the printing device. The rotating wheel is coupled to an interrupter disc means which is adapted to provide signal pulses for coordinating the proper time for actuation of the printing device. In addition an optical monitor may be provided to monitor the fact that the printing has occurred. A postage memory register includes a random access memory (RAM) for storing a purchased amount of postage. During each meter use the microprocessor subtracts the amount of postage printed from the amount of postage stored in the memory register. When the amount of postage stored in the memory register is depleted to a predetermined minimum amount the microprocessor senses this condition and provides a signal for inhibiting the further use (lock-out) of the printing device and thus, the meter.

31 Claims, 23 Drawing Figures

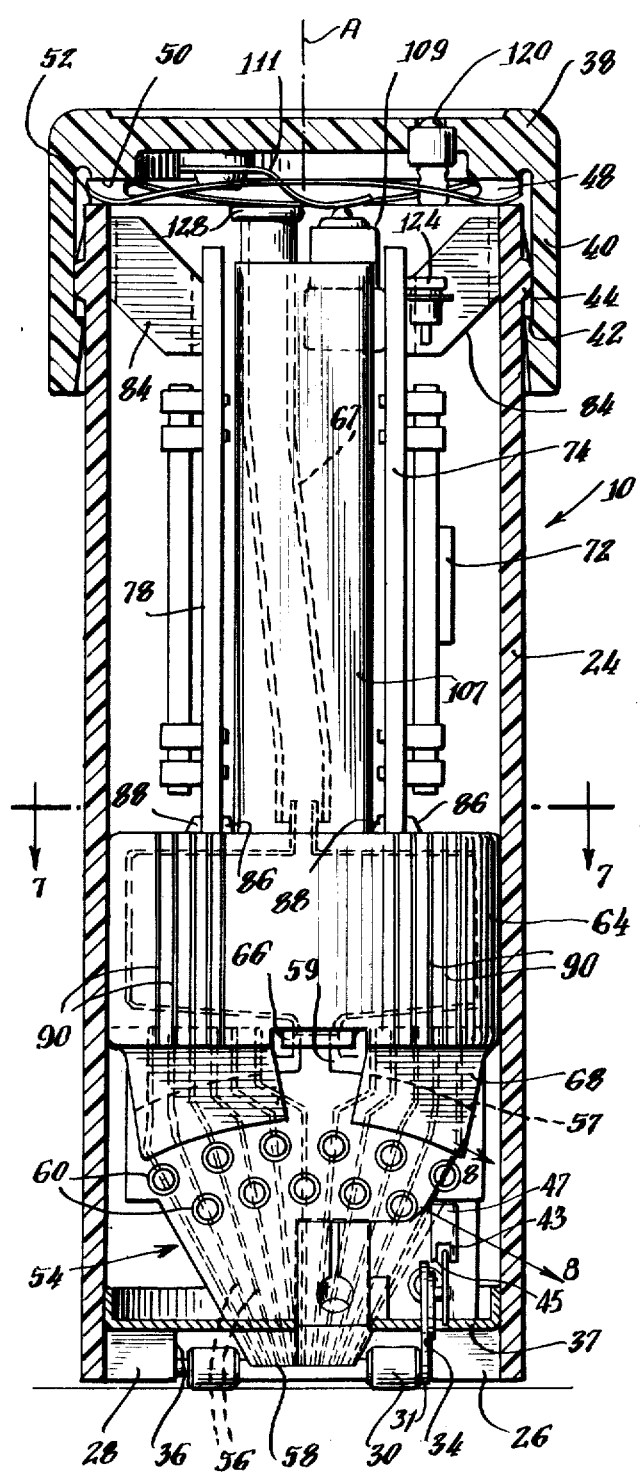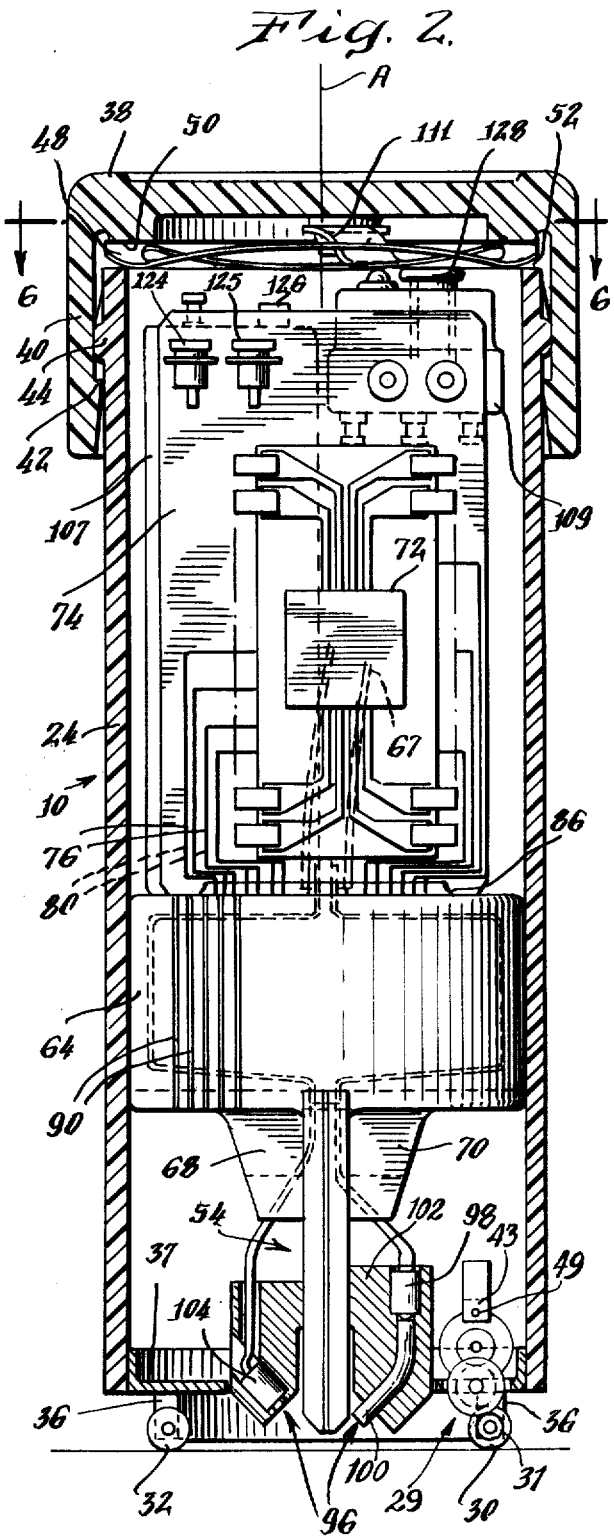

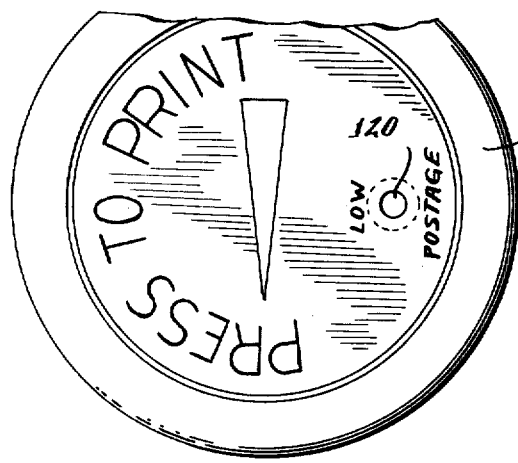
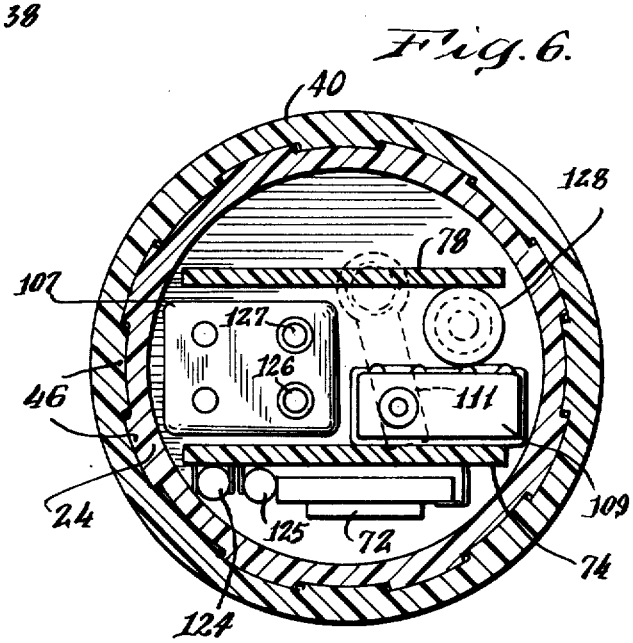
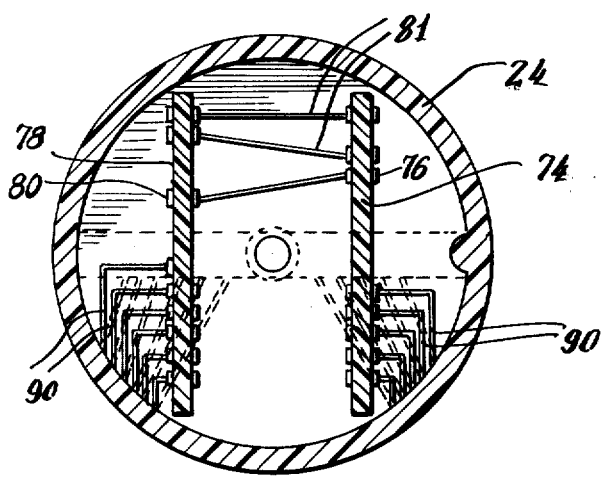
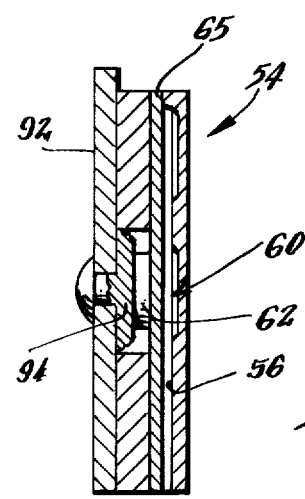
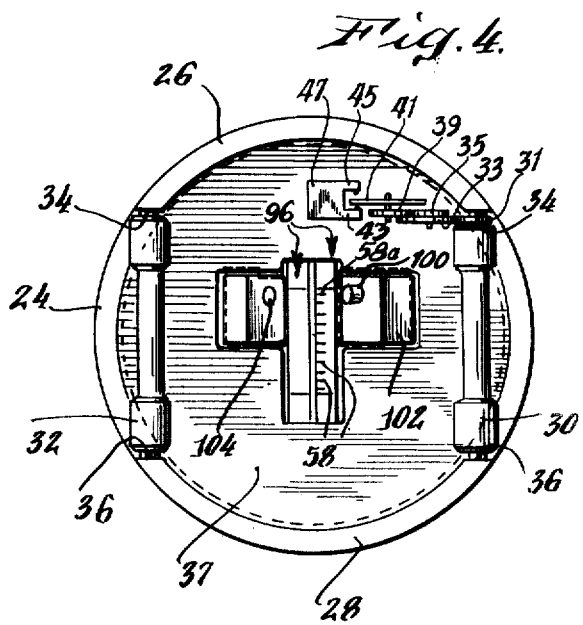

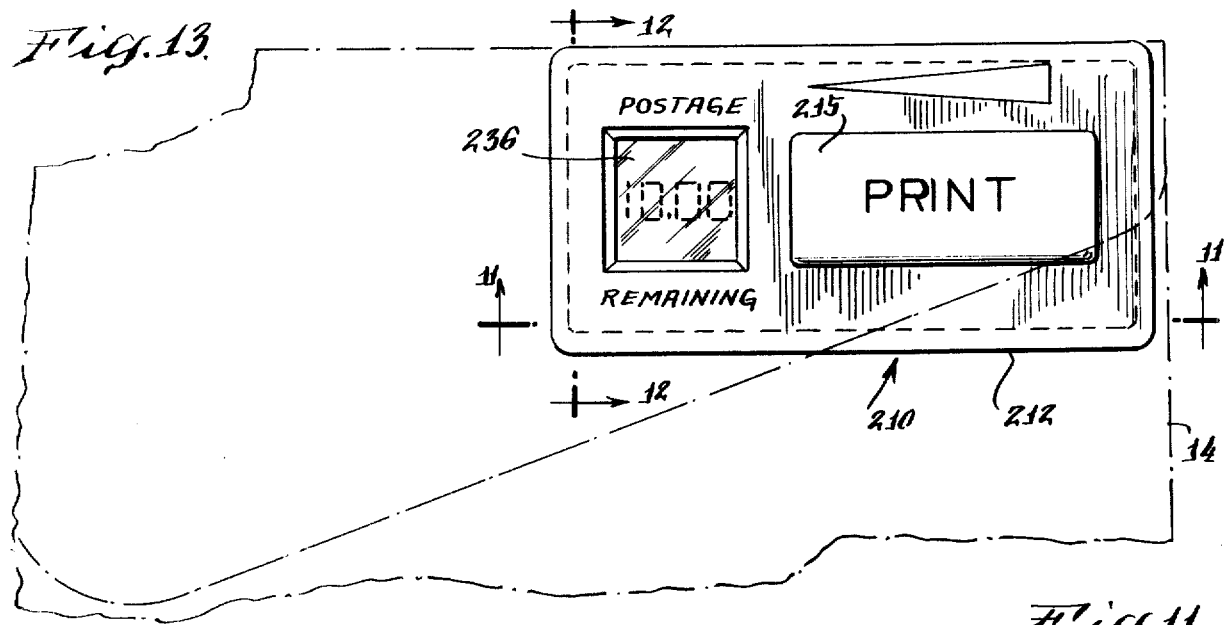
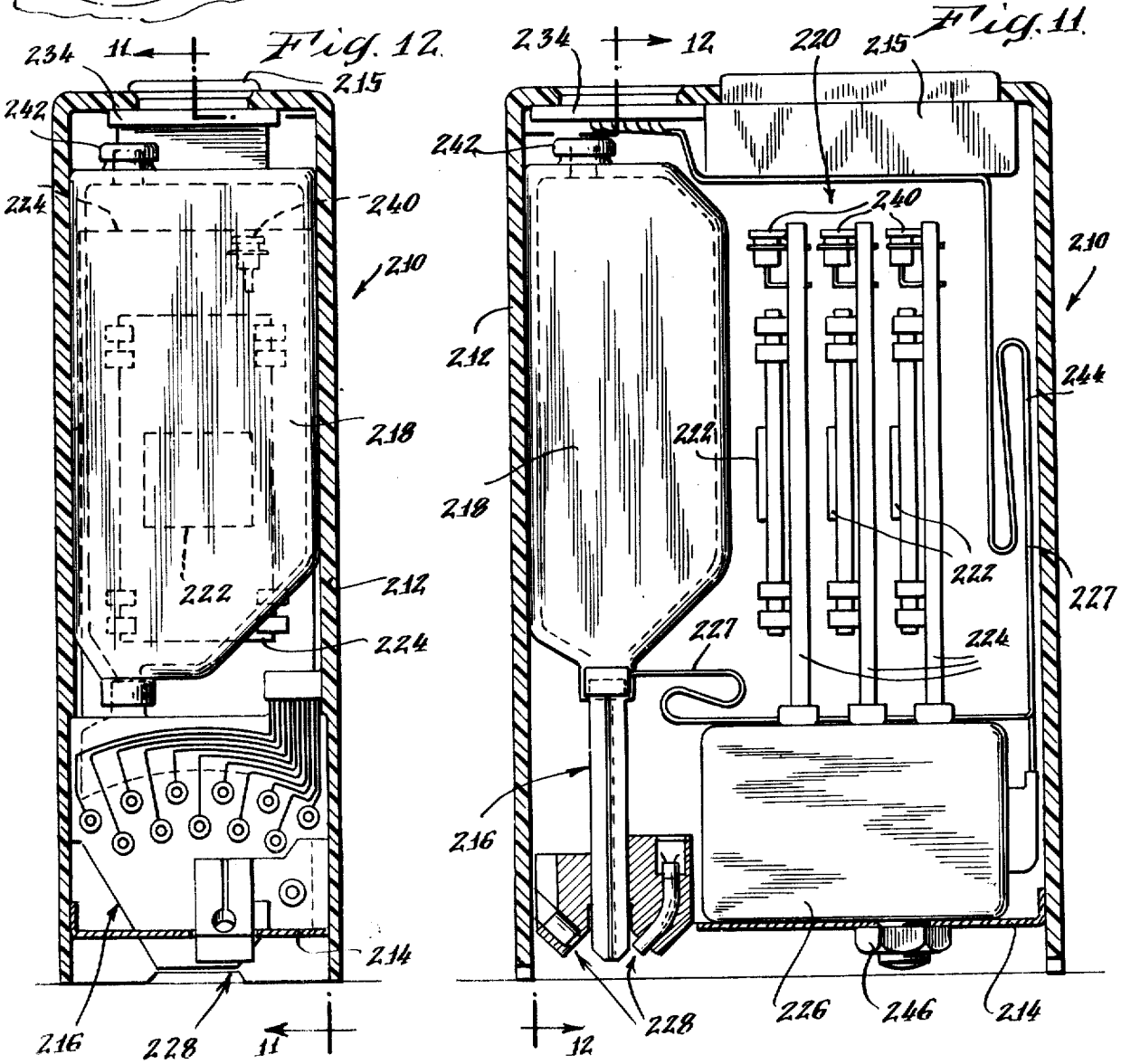

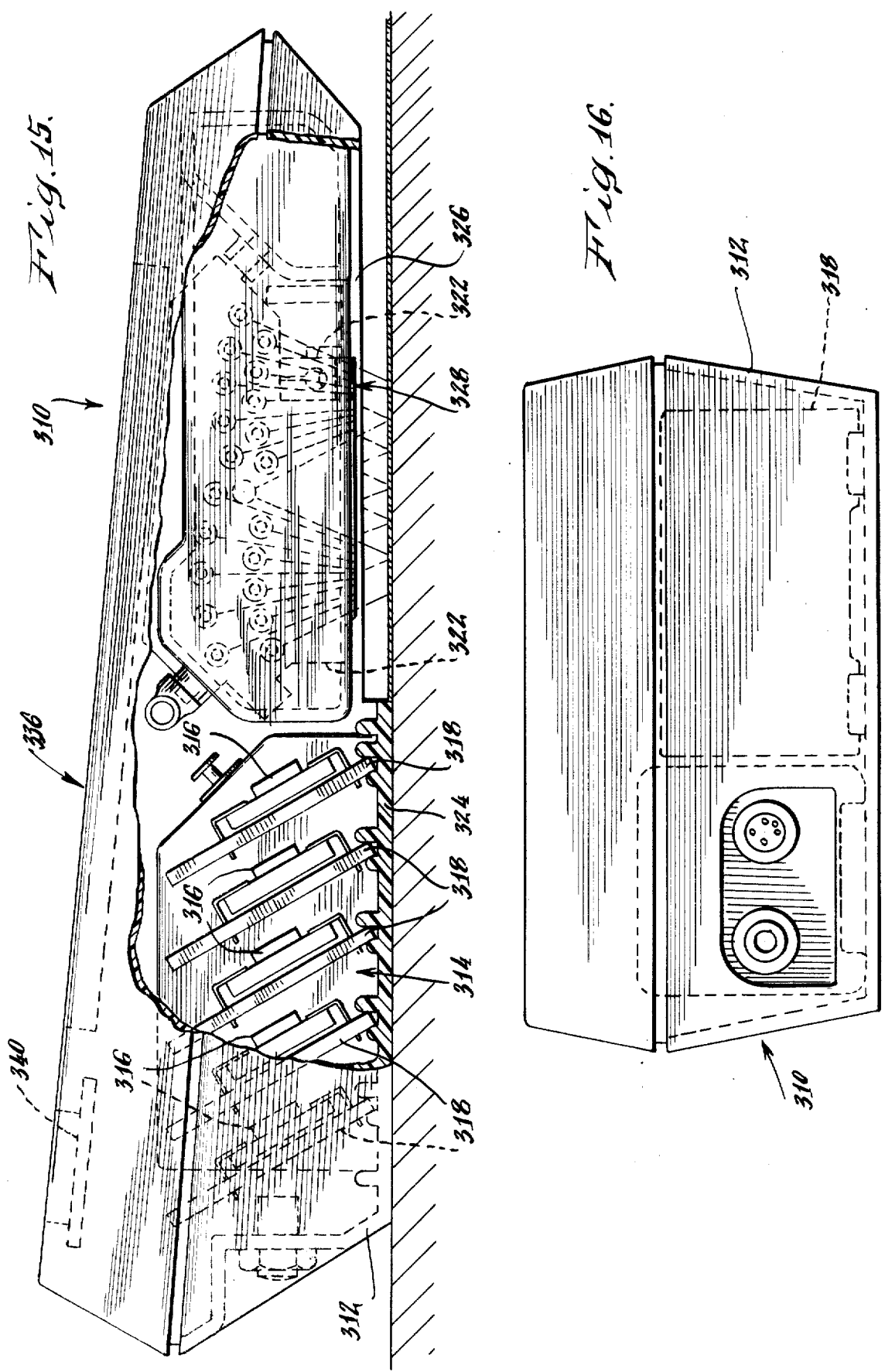

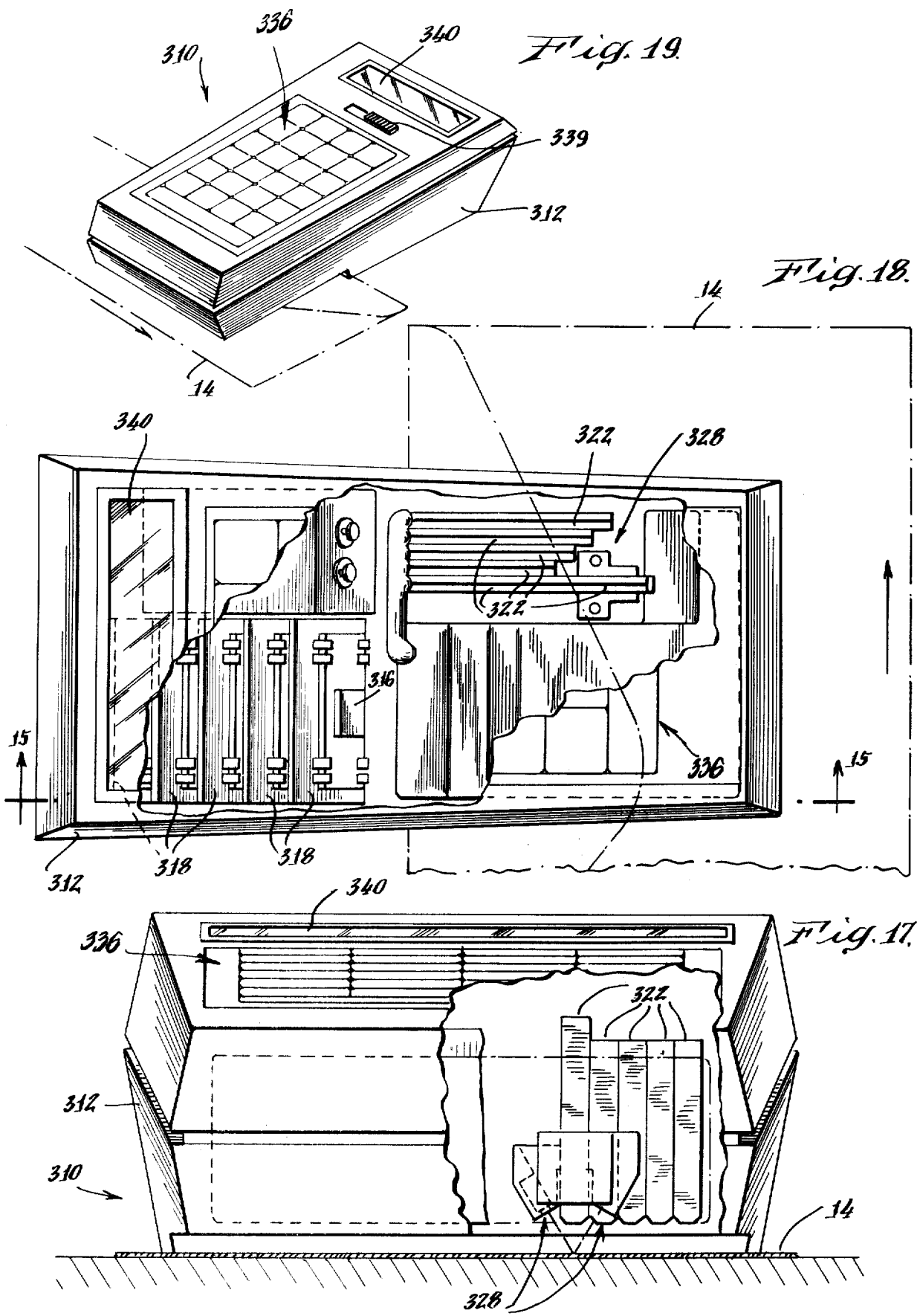

MICROCOMPUTERIZED MINIATURE POSTAGE METER

CROSS REFERENCE

This application is a continuation-in-part of U.S. application Ser. No. 649,152 filed Jan. 14, 1976.

BACKGROUND OF THE INVENTION

1. Field of the Invention

The present invention relates to postage meters and, in particular, to microcomputerized, miniature postage meters which may be held in and operated by hand, are completely portable, and may be stored in any one of a number of small spaces such as a pocket, purse, or briefcase.

Postage meters are now widely used by commercial and industrial businesses to selectively print postage indicia on documents such as envelopes, labels, and the like. Managers of these businesses, which frequently generate medium to large volumes of mail, have found that meters are capable of handling postage far more rapidly, economically, and conveniently, than manual operators who individually moisten and position previously printed postage stamps on mailing documents. Furthermore, printed postage is attractive as well as impressive to the recipient of the mail on which it appears.

However, individuals who use postal services relatively infrequently compared to business enterprises have been unable to avail themselves of the advantages of postage meters for a number of reasons. Primarily, the use of presently known meters is only economically feasible when relatively large volumes of postage are printed. Furthermore, since these meters are ordinarily large and cumbersome, they are usually mounted for operating at a fixed location. Therefore, they are inconvenient for use by a person who is accustomed to carrying postage, in the form of previously printed stamps, with him.

2. Description of the Prior Art

Postage meters which are now generally available are specifically designed for institutional use by entities having need for large volumes of postage. Thus, as noted, these meters are usually large and are mounted at a fixed location. Typically, they employ a complex mechanical printing device comprised of either a rotatably mounted printing die plate, operated to rotate in synchronism with linearly moving documents, or a fixed printing die plate against which documents are mechanically pressed, to imprint the documents with the desired postage indicia.

A postage meter construction has been proposed in U.S. Pat. No. 3,869,986 (Hubbard), assigned to the assignee of the present invention, which employs a rotatably mounted die plate to print fixed postage information, such as the postage meter registration number, and an ink jet printing device to print variable postage information such as the date and postage amount.

Still more sophisticated postage meters, which nevertheless include mechanical postage printing apparatus, but which employ a microcomputer set to perform control and data processing functions, are disclosed in copending U.S. patent applications, Ser. Nos. 536,248 filed, Dec. 23, 1974 and 568,460 filed Apr. 16, 1975, and U.S. Pat. Nos. 3,978,457 and 4,097,923 which, respectively, issued from said applications, all assigned to the assignee of the present invention. However, none of these postage meters may be conveniently used by an individual who generates relatively low volumes of mail yet who requires immediate access to postage regardless of the time or place.

SUMMARY OF THE INVENTION

In its preferred embodiments, the microcomputerized, miniature postage meter of the present invention is completely portable and is designed to be held in and operated by hand and may be approximately the same size as a disposable butane-type cigarette lighter. Consequently, this postage meter may be stored in an extremely small space such as a pocket, handbag, or briefcase and may be transported and used as conveniently as previously printed postage stamps.

The compactness of the microcomputerized, miniature postage meter of the present invention and, hence, its extremely convenient operation are achieved by eliminating the ordinarily cumbersome document handling apparatus and printing apparatus which prior meters include. Instead of mechanically transporting or positioning a document relative to postage printing apparatus as do previously known meters, this miniature postage meter performs no document handling function. Compactness is further achieved by use of a microcomputer which performs the control and data processing functions of the meter.

In its preferred embodiments, the microcomputerized, miniature postage meter comprises printing apparatus in the form of an ink jet printing device which is mounted to be moved in close proximity relative to a document and is adapted to project ink droplets onto the document when so moved. An encoded wheel mounted proximate the printing device monitors the relative document-to-printing device movement. The microcomputer, upon receipt of signal pulses from the encoded wheel, is programmed to sequentially actuate the ink jet printing device to project ink droplets onto the document in a pattern that forms the desired postage indicia. Also an optical monitor may be included to indicate that the printing has occurred on the document. Signal pulses obtained from the encoded wheel coordinate the actuation of the printing device with the relative document-to-printing device movement in order to properly form the postage indicia without distortion.

Purchased postage is stored in a postage memory register, consisting of a nonvolatile random access memory (RAM) incorporated in the microcomputer, from which is subtracted the amount of postage printed during each meter use. The subtraction is under the control of the microprocessor and program memory. Prior to printing the microprocessor compares the selected amount of postage with the amount of postage available in the memory register. If an insufficient amount of postage is in the register, the microprocessor does not provide a signal voltage to activate the printing device. Thus, the postage meter is locked-out or disabled when the stored postage is depleted to a predetermined minimum amount. Accordingly, the meter becomes inoperable when the postage stored in it has been essentially exhausted.

In other embodiments, the postage meter of the invention may be incorporated with a hand-held, mathematical calculator and may include a display for indicating, in simple fashion, when a predetermined minimum amount of postage remains in the memory register or, in more complex fashion, the exact amount of postage which remains in the memory register.

The microcomputerized, miniature postage meter of the present invention may be used in conjunction with a novel method of distributing and dispensing postage. The meter is constructed so that it may be conveniently connected to a central postage distribution station. That is, the postage memory register of the microcomputer may be connected through an easily accessible jack to a postage dispensing computer so that an amount of purchased postage may be entered in the meter. The meter may then be distributed by mail or at rental centers to individuals for their use. When the postage stored in the memory register is exhausted, the meter is returned to the central postage distribution station for entry of additional purchased postage. Alternatively, the meter may be purchased by its user, and brought to the central station when postage entry or re-entry is needed.

In addition to the advantages of miniature postage meter use accruing to the ultimate user, the United States Government should save substantial amounts in printing costs since the use of stamps may be decreased.

Accordingly, it is an object of the present invention to provide a microcomputerized, miniature postage meter which may be used by individuals as conveniently as previously printed postage stamps are now used. Further, this invention contemplates a method of distributing and dispensing postage that employs the miniature postage meter to decrease the need for previously printed postage and, hence, governmental printing costs and further to enhance the individual consumer's ease of using postage.

Other objects, aspects, and advantages of the present invention will be pointed out in, or will be understood from, the following detailed description provided below in conjunction with the accompanying drawings.

BRIEF DESCRIPTION OF THE DRAWINGS

FIG. 2 is a vertical cross-sectional view taken through plane 2—2 in FIG. 1 illustrating the internal components of this miniature postage meter;

FIG. 3 is a second vertical cross-sectional view taken through plane 3—3 in FIG. 1 at a right angle to plane 2—2 also illustrating internal components of the meter, particularly the ink jet printing device, in detail;

FIG. 4 is a bottom plan view of the postage meter of FIG. 1 showing the array of outlets from the ink jet printing device;

FIG. 5 is a top plan view of the postage meter shown in FIG. 1;

FIG. 6 is a horizontal cross-sectional view taken through plane 6—6 in FIG. 2 illustrating an input jack for entering postage in the miniature postage meter;

FIG. 7 is a horizontal cross-sectional view taken through plane 7—7 in FIG. 3;

FIG. 8 is an enlarged cross-sectional view taken through plane 8—8 in FIG. 3 illustrating a portion of the ink jet printing device;

FIG. 11 is a vertical cross-sectional view taken through plane 11—11 in FIG. 13 of a second embodiment of the miniature postage meter of the present invention having a display for indicating the amount of stored postage remaining in the meter;

FIG. 12 is a second vertical cross-sectional view taken through plane 12—12 in FIG. 13 of this second embodiment shown in FIG. 11;

FIG. 13 is a top plan view of the second embodiment shown in FIG. 11;

FIG. 15 is a partial vertical cross-sectional view taken through plane 15—15 in FIG. 18 of a third embodiment of the postage meter of the present invention incorporated with a hand-held mathematical calculator;

FIG. 16 is a rear elevational view of the postage meter-calculator apparatus shown in FIG. 15;

FIG. 17 is a front elevational view of the apparatus shown in FIG. 15 partly broken away to show detail;

FIG. 18 is a top plan view of the apparatus shown in FIG. 15, also partly broken away to show detail;

FIG. 19 is a perspective view of the third embodiment shown while a document is being imprinted with postage indicia;

DETAILED DESCRIPTION OF THE PREFERRED EMBODIMENTS

Figure 1:
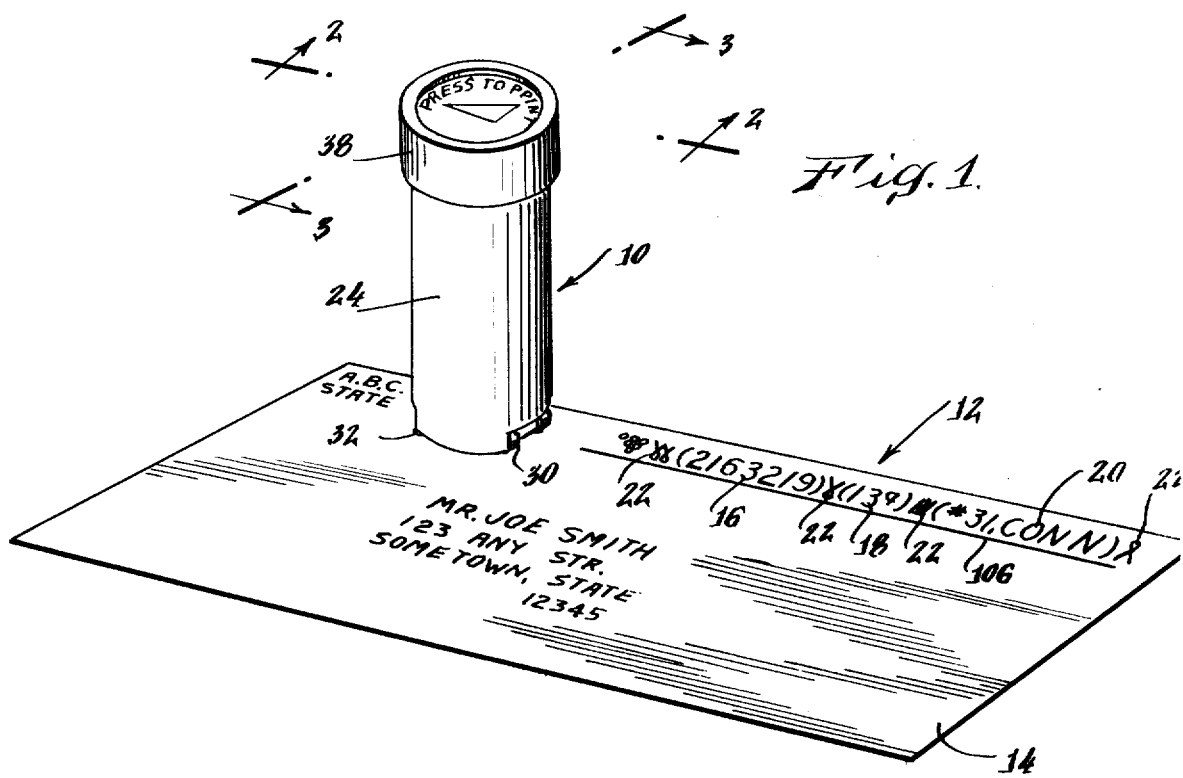
FIG. 1 is a perspective view of one embodiment of the computerized, miniature postage meter of the present invention positioned relative to a document, in the form of an envelope, immediately after printing postage indicia thereon.

FIG. 1 illustrates one embodiment of the microcomputerized, miniature postage meter of the present invention, generally indicated at 10, in position immediately after printing predetermined postage indicia 12 on the upper right hand corner of a document in the form of an envelope 14. Of course, postage indicia may be as easily printed on other forms of documents, such as labels, that are affixed to packages or directly on the packages.

The illustrated envelope 14 is of conventional letter size, namely 9.5 inches (24.1 cm) wide and 4.0 (10.2 cm) inches high. It can be readily appreciated, then, that the miniature postage meter 10 is extremely small (approximately 3.75 inches (9.5 cm) in height and 1.5 inches (3.8 cm) in diameter) when compared with other presently known postage meters used in business and industry. The postage meter is comparable in size to many articles which people frequently carry with them, such as butane-type cigarette lighters, key carrying cases, and cosmetic compacts. Since the meter is completely self-contained, and, when activated in a manner described below in detail, ready to print postage that has been stored in it at any time or place, it is as convenient to use as previously printed postage stamps. Furthermore, large amounts of postage can be stored in this meter more easily than similar amounts, in the form of small denomination stamps, can be stored.

As will be explained in greater detail below, the compact size of the postage meter 10 is achieved by the use of a single chip microcomputer which performs the meter control and data processing functions, by the elimination of all mechanical document handling apparatus, and by the elimination of usually large and cumbersome mechanical printing apparatus. Specifically, the meter is designed to be moved relative to the document by the operator while an electronic printing device, controlled by the microcomputer, prints the desired postage indicia.

In this preferred embodiment, postage meter 10 is programmed to print postage indicia 12 having only fixed information. For example, as shown in FIG. 1 and in detail in FIG. 10, the postage indicia information may include a meter registration number 16, the postage amount 18, and the state and number 20 of the central postage distributing station from which the meter was issued. The information may also include prearranged code markings 22 intended to discourage counterfeit postage printing. The meter may be programmed to print additional fixed information or variable information such as the date. Through more complex refinements described below, the meter may also be adapted to print variable postage amounts.

Referring now to FIGS. 2 through 8, the microcomputerized miniature postage meter 10 includes a main cylindrical body 24 which houses operating components of the meter. At its lower end, body 24 terminates in two partially cylindrical, diametrically opposed skirts 26 and 28 (FIGS. 2, 3, and 4). Two guide rollers 30 and 32, which are mounted to span the distance between opposed, axially extending edges 34 and 36 of the opposing skirts, facilitate movement of the meter 10 over the envelope 14 or other document.

The guide roller 30 is in cooperative engagement with a gear train 29 which includes gears 31, 33, 35, and 39 intermeshed in a conventional manner. Gear 31 is affixed to guide roller 30 and rotates therewith; gears 33 and 35 are affixed to a common shaft and are selected to provide the proper speed ratio for an encoder wheel or disc 41. The encoder wheel is disposed between extending arms 43 and 45 of a housing 47. Disposed in arm 43 is a light emitting diode (LED) 49 which emits light rays that are directed towards and received by a photoelectric detector (phototransistor) 51 disposed in arm 45 and in line with LED 49. Apertures provided in the encoder disc 41 intermittently block the light rays and cause the photoelectric detector 51 to provide signal pulses when the light impinges thereon. It is also apparent to those knowledgeable in the art that encoder disc 41 may be provided with intermittent magnetic strips that may be sensed by a Hall detector in lieu of the photoelectric detector. In each case however, the detected pulses would be related to the movement of the postage meter 10 across the document or envelope 14.

The meter components are concealed and protected in the cylindrical body 24 from both the bottom and top. The bottom of body 24 is enclosed by a base support plate 37. The top of the body is enclosed by a cap 38, having a cylindrical side wall 40 telescopically received for limited movement thereon. The side wall 40 is provided with an inwardly directed annular rabbet 42 at its lower margin that engages an outwardly directed annular rabbet 44 formed on body 24 to retain the cap on the body. However, a resilient wave washer 48, interposed between the cap bottom 50 and the body top 53, urges the cap axially outwardly from the body as far as permitted by the interengaging rabbets. Further, as shown in FIG. 6, the interior of cap side wall 40 and the exterior of the upper portion of body 24 are formed with interengaging splines 46 which prevent relative body-cap rotation about their common axis A. As explained below, the meter is activated to print postage indicia by depressing the cap down onto the body.

As can be seen in FIGS. 2 and 3, the operating components of the meter include a printing apparatus in the form of an ink jet printing device, generally indicated at 54, mounted on base plate 37. This printing device is designed to project ink droplets onto the document in a pattern forming postage indicia 12 when moved in close proximity relative thereto as depicted in FIG. 1. The device 54 comprises eleven precisely aligned, closely spaced, ink-conducting capillaries or channels 56 (FIG. 3), the outlet ends 58 of which are arranged in a linear array which extends in a direction parallel to the axes of guide rollers 30 and 32 (FIG. 4). Further, these outlet ends 58 are positioned in close relation to the document when the meter is supported thereon. Accordingly, the linear capillary outlet end array extends perpendicularly to the direction in which the miniature postage meter 10 is designed to be moved relative to the envelope 14. At their ends opposite the outlet ends 58, capillaries 56 all communicate with an arcuate manifold 57 supplied through a central conduit 59.

As shown in FIG. 3 and in greater detail in FIG. 8, an electrical-to-mechanical transducer 60 is located in communication with each of the ink capillaries 56. Each transducer includes a single disc of piezoelectric ceramic 62 bonded to an electrically inactive substrate 65. When the ceramic is energized, a slight physical deflection or "dishing" is produced which is sufficient to cause ejection of a tiny ink droplet through the outlet end 58 of the associated capillary 56. Accordingly, when the transducers are energized in proper sequence as the meter 10 is moved across the envelope 14, the postage indicia 12 are formed as a pattern of tiny projected ink droplets.

Ink jet printing devices similar to that described above are presently produced and sold by Gould, Inc., Chicago, Ill., and electrical-to-mechanical transducers such as those described, commonly called "unimorphs," are manufactured by, for example, Vernitron Piezoelectric Division, Bedford, Ohio.

The printing device 54 supports an ink reservoir 64 which supplies ink to central conduit 59, manifold 57, and hence capillaries 56. More particularly, the reservoir is formed with a bottom coupling 66 which engages main conduit 59. Opposing flanges 68 and 70 (FIGS. 2 and 3) formed on the bottom of reservoir 64 embrace the upper portion of printer 54 and guide the coupling 66 to conduit 59. A capped filler tube 67 shown in phantom lines in FIGS. 2 and 3, is in fluid communication with and is used to fill the reservoir.

As the meter is moved across the document on guide rollers 30 and 32, the ink jet printing device 54 is sequentially actuated by a microcomputer 72 to project ink droplets onto the document surface in a postage indicia printing pattern which has been stored as a matrix pattern in the memory portion 108 of the microcomputer. In order to accomplish this control function, the microcomputer 72 is electrically connected to the individual transducers 60 of printing device 54 in a manner that may be described with reference to FIGS. 2, 3, 7 and 8. The microcomputer is mounted on and electrically connected to a first printed circuit board 74 which has printed conductive paths 76 thereon. A second printed circuit board 78, also having conductive paths 80 thereon, is electrically connected to the first and, hence, to microcomputer 72, by conductors 81 (FIG. 7). Both boards are mounted in vertical, mutually parallel relation in the cylindrical body 24 and are supported at their upper ends by suitable struts 84 mounted from the inner cylinder wall (FIG. 3). Each board is further supported at its lower end by two opposing, upwardly projecting flanges 86 and 88 formed on the top of ink reservoir 64 (FIGS. 2 and 3). The connections continue through conductive paths 90 formed on the ink reservoir. In particular, the reservoir is encased in silicone rubber into which the conductive paths are molded in a manner developed by Chomerics, Inc., Woburn, Mass. As shown in FIG. 2, conductive paths 76 and 80 which carry control signals to transducers 60 terminate at locations between flanges 86 and 88. Similarly, paths 90 terminate in flanges 86 and 88 which accordingly form sockets for the bottoms of circuit boards 74 and 78. The connections are completed through flanges 68 and 70 which embrace printing device 54. As shown in FIG. 8, conductive paths 92 are printed on the face of device 54, are contacted by paths 90 in flanges 68 and 70, and are connected to the transducer ceramic 62 through a pass 94 of conductive rubber. (Note that paths 90 properly appear to overlie capillaries 56 in FIG. 3.)

The microcomputer also automatically coordinates the rate at which it sequentially actuates the ink printing device with the movement of the meter and, hence, the printing device relative to the document. In order to do so, the microcomputer is supplied with signal pulses obtained from the encoder wheel 41 indicative of the relative meter-to-document movement.

Figure 10:
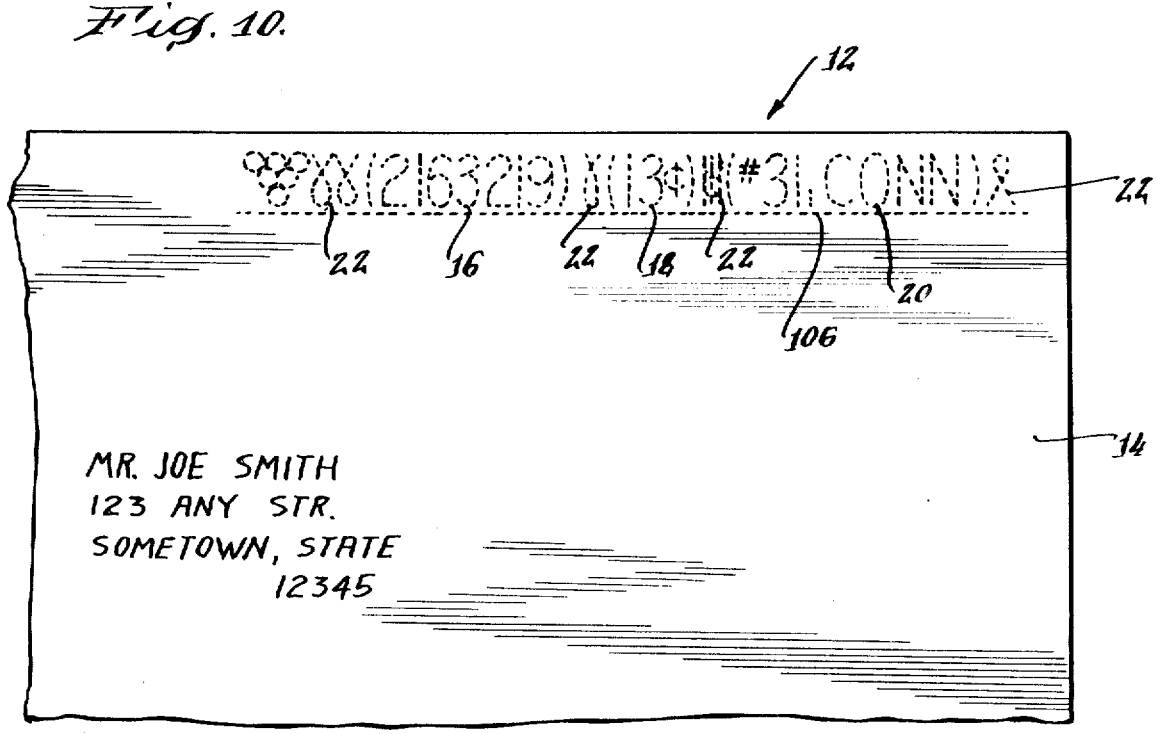
FIG. 10 is an enlarged view of the upper right hand corner of the envelope showing, in detail, the postage indicia printed by the miniature postage meter of the present invention.

In an alternative embodiment shown in dotted lines, an optical monitor, generally indicated at 96 and shown in detail in FIGS. 2 and 4, may include a phototransistor 98 to which light is conducted by a fiber optic probe 100. The probe is fixed in a mounting block 102 to focus on the area of the envelope 14 where ink droplets are projected from the lowermost capillary outlet 58a. The optical monitor 96 further may include a source of light in the form of a light emitting diode (LED) 104 also positioned in mounting block 102 to focus on the area of the envelope at which ink droplets from outlet 58a are projected. Microcomputer 72 is programmed so that an ink droplet is projected from outlet 58a each time printing device 54 is actuated. When an optical monitor is utilized to monitor movement a control pattern in the form of a line 106 underscoring other information in the postage indicia as shown in FIG. 10 is provided. Accordingly, the optical monitor 96 observes this control pattern and provides signal pulses related to the movement of the monitor over the line. These signal pulses may be coupled to the microcomputer 72 to control the time at which the printing device 54 is activated.

The functional interrelationship of the microcomputer 72, ink jet printing device 54, and the encoded wheel 41 and further details of microcomputer operation may be most easily described with reference to FIG. 9. As shown therein, the microcomputer 72 includes the program memory circuitry 108 which controls the logic program sequence and actuation of the ink jet printing device 54 and is connected thereto in the manner described above.

The actuation of the printing device with document movement is coordinated by monitoring the signal pulses from the encoder wheel 41. In this manner, the postage indicia is properly formed regardless of the rate at which the meter is moved across the envelope.

The postage memory register circuitry 116 is a nonvolatile random access memory and is also part of microcomputer 72. The memory 116 stores purchased amounts of postage and is addressable by the CPU 113 on line 115 to subtract from the stored amount of postage the amount printed during each meter use. That is, at the initiation of printing of one postage indicator or mark, the CPU 113 addresses the memory register 116 to reduce the stored amount of postage by the amount printed.

The memory register 116, although part of the microcomputer 72 is a separate component and may be purchased from the Motorola Corporation, Phoenix, Ariz. as Part No. MC14505. The other circuit portions of the microcomputer 72 may be purchased as a single unit from the Intel Corporation of Santa Clara, Calif., Part No. 8048.

The microcomputer 72 is also provided with input port circuitry 119 which is connected to the CPU 113, via line 114, and is adapted to receive the input signal pulses from the encoded wheel 41, via line 121, in addition to the input pulses from an external postage computer, via line 123, to be described hereinafter. The CPU 113 is also coupled via the output port circuitry 118 and line 117, to the ink jet printing device 54.

The microcomputer 72 is also programmed to include a disabling or lock-out function which is initiated by the CPU 113 and renders the meter inoperative when the stored amount of postage is depleted to a predetermined minimum amount. For example, the disabling lock-out function may be programmed in the CPU to lock-out the meter (stop printing) when one imprint remains in the memory register 116. Further, the meter may be provided with a low postage indicator in the form of a light emitting diode 120, mounted in cap 38, (FIGS. 3 and 5) which is energized by the CPU when some amount of postage higher than the minimum amount remains in the memory. For example, the CPU might be set to turn LED 120 on when ten imprints remain to be used. In this way, the meter warns the user that more postage must be purchased.

As shown in FIGS. 2, 3, 6 and 9, the microcomputer 72, associated components, and the LED 104 are energized by a power supply 107 in the form of a rechargeable, nickel cadmium battery which is connected to activate the meter through a microswitch 109. This microswitch is mounted with circuit board 74 in operative proximity to a protective leaf spring 111 mounted on cap 38. When the cap is depressed, the switch is closed to activate the meter for one print cycle. (Note: The disabling lock-out function may also be utilized to disconnect the power supply 107 at the same time the CPU circuit is disabled.)

The microcomputerized miniature postage meter of the present invention is used as follows. When one wishes to imprint a document with postage indicia, the cap is pressed downwardly to close microswitch 109 which enables the power supply 107 to activate the microcomputer 72. If insufficient postage is in the meter, indicator 120 (FIG. 5) lights up and the meter program ends up in a trap thus inhibiting further operation.

If sufficient postage is available, the amount for one imprint is deducted, then the meter waits for encoder pulses before initiating printing. The meter is placed on the upper right hand corner of the envelope 14 with the indicating arrow printed on the cap 38 pointing from right to left along the top of the envelope. The meter is then moved from right to left on rollers 30 and 32 at any desired rate. (Right-to-left movement is chosen to insure that the postage indicia is printed entirely on the document.) The encoder wheel provides signal pulses as the meter is moved relative to the document. These signal pulses are coupled to the CPU which actuates the ink jet printing device 54 at a rate which properly forms the postage indicia without distortion.

Figure 9:
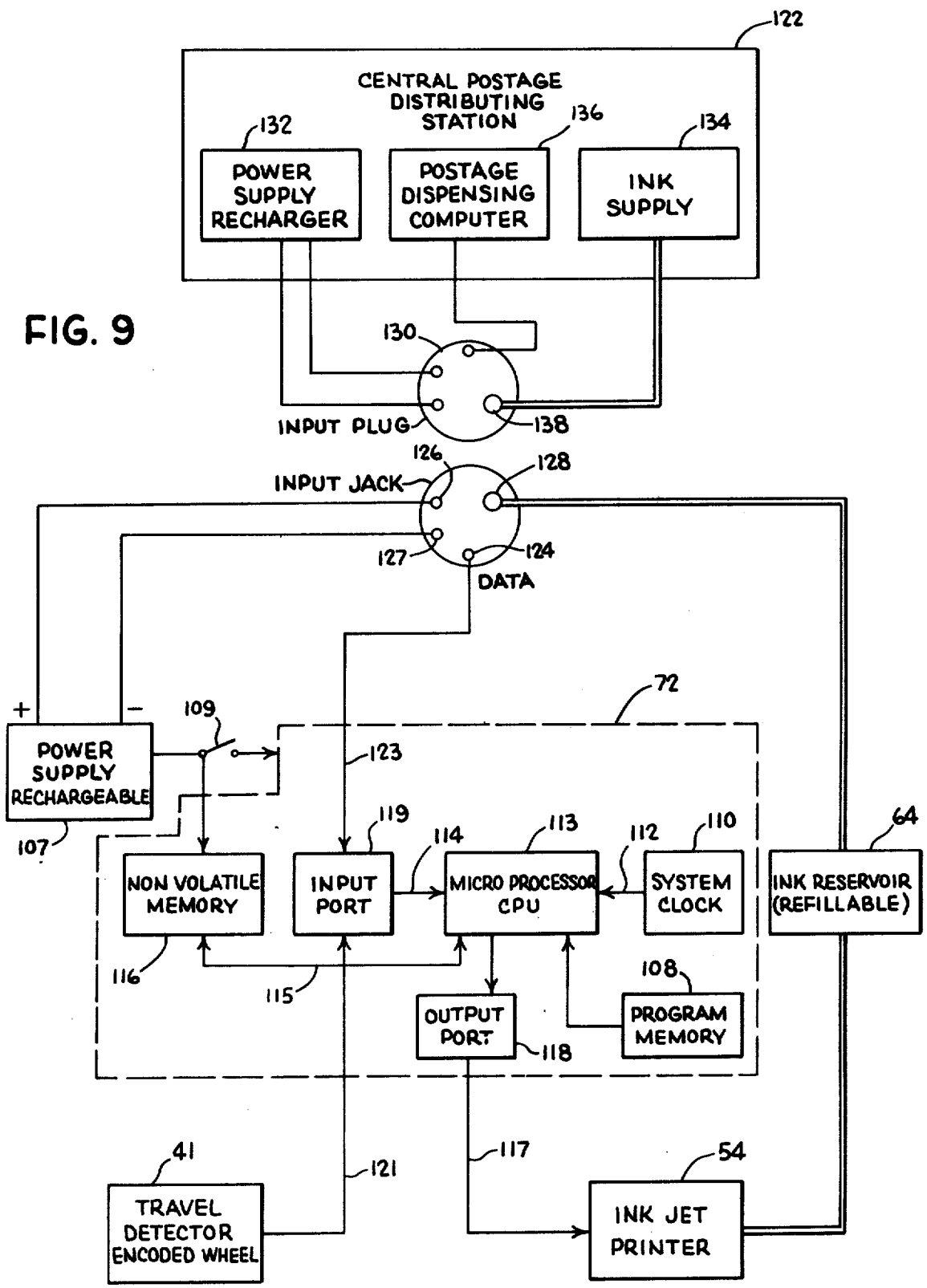
FIG. 9 is a functional block diagram of the postage meter shown in FIG. 1 and of a central postage distributing station to which it is connected for re-entry of postage, for power supply recharging, and for refilling with ink.
Figure 9A:
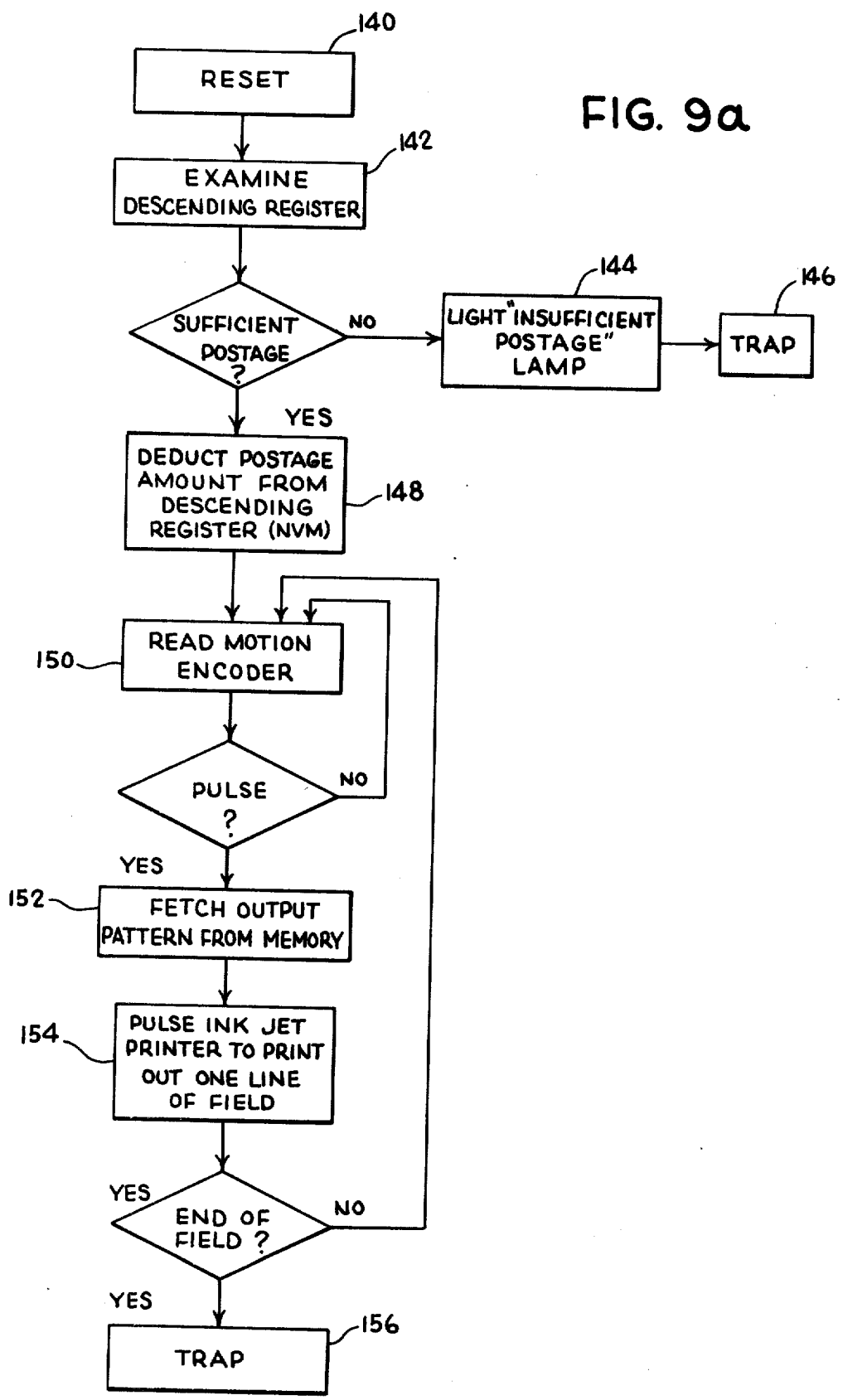
FIG. 9a is a flow chart showing the logic steps performed by the microprocessor and register of the postage meter shown in FIG. 1.

The functioning of the microcomputer 72 may best be understood by referring to FIG. 9a which shows the logic steps to accomplish the printing of postage indicia on a document.

The initial step is the start or reset 140 of the microcomputer which is accomplished by pressing the cap in a downwardly direction closing microswitch 109 which energizes the microcomputer. The CPU 113 immediately examines the descending register 142 located within the memory 116 to determine if a sufficient amount of postage remains therein to enable the logic steps to continue. If insufficient postage is in the register, the CPU will provide an output voltage to the circuitry 144 energizing an insufficient postage light 120. The CPU then loops in a trap, thus disabling the meter and preventing the ink jet printer from being activated.

Alternatively, if sufficient postage remains in the descending register of the memory 116, the CPU subtracts (deducts) the preset amount of postage 148 to be printed from the descending register. The CPU is now permitted to determine if a signal pulse is being provided by the encoder wheel 41, indicating motion 150 of the meter across a document. If no motion pulse is present from the encoder wheel, the CPU waits until a pulse signifying motion across a document is obtained. Once a pulse from the encoder is present the CPU interrogates the coded dot pattern stored in the program memory 108 and recalls and couples it 152 to the circuitry 154 to energize the jet printing device 54 which causes the printing of a single line of field. These logic steps are repeated until the complete field is printed (postage indicia 20) whereby a locking out or trapping function 156 occurs disabling the CPU, as described earlier, until reset for the next printing.

After repeated uses when the postage stored in the memory register has been depleted to the predetermined minimum amount, a user cannot enable the meter to print more postage until an additional postage amount is stored in the memory register 116 by reprogramming it.

The miniature postage meter of the present invention is designed for repeated reuse in conjunction with a central postage distributing station 122 diagrammatically illustrated in FIG. 9. As shown in FIGS. 2, 3 and 6, the meter includes a number of input connections all accessible when cap 38 is removed. These input connections comprise a jack plug 124 which is connected to the microcomputer. Further, two jack plugs 126 and 127 are positioned at the top of the power supply for connection with a recharging source. Finally, inlet filler tube 67 to the ink reservoir 64 has a cover 128 which is removed and replaced with cap 138. When the meter 10 is returned to the central postage distributing station 122, the cap 38 is removed by an authorized person. Cap 38 may be provided with a special lock or seal which would indicate tampering by an unauthorized person. The meter is then plugged into the central station 122 which has a power supply recharger 132, an ink supply 134, and a postage dispensing computer 136 adapted to enter purchased postage into the microcomputer memory register 116. The main input plug 130 is arranged to simultaneously connect microcomputer 72 with dispensing computer 136, the power supply 107 with the power supply recharger 132. Connection is also made between the ink reservoir 64 and the ink supply 134. Thus, the power supply may be recharged, additional purchased postage may be reentered in the memory register, and the ink reservoir may be refilled in one step.

The microcomputerized miniature postage meter of the present invention may be adapted in more sophisticated embodiments for expanded capability. For example, FIGS. 11 through 14 illustrate a second embodiment, which has a display for indicating the exact amount of postage that remains stored in the meter after each use. The second embodiment of the postage meter of the invention, generally indicated at 210, includes a rectangular body 212 which is closed at the top and open at the bottom, and which is approximately the same size as a key carrying case. A self-contained start print button 215 is mounted in the top of the body. A base support plate 214 encloses the bottom of the body and supports the meter components which include an ink jet printing device 216 supplied with ink by an ink reservoir 218 in the same fashion as described with reference to the first embodiment. The ink jet printing device is actuated by a microcomputer 220 which may have three integrated circuit chips 222 each mounted on a separate printed circuit board 224. The circuit boards are mounted in vertical, mutually parallel relation above a power supply 226 in the form of a nickel cadmium battery supported on base plate 214. The circuit boards 224 and, hence, chips 222, are interconnected and are further connected with other meter components such as start print button 215, power supply 226 and printing device 216 by a multiconductor ribbon-type cable 227.

As with the meter of the first embodiment, the meter 210 of the second is adapted to be moved in operative proximity relative to a document, during which time the microcomputer 220 actuates the printing device 216 to properly form desired postage indicia without distortion. In order to do so, microcomputer 220 is connected through cable 227 to an encoded wheel as in the first embodiment or an optical monitor 228 previously described, which observes the relative movement between the meter and document and provides signal pulses to the microcomputer relative thereto.

Figure 14:
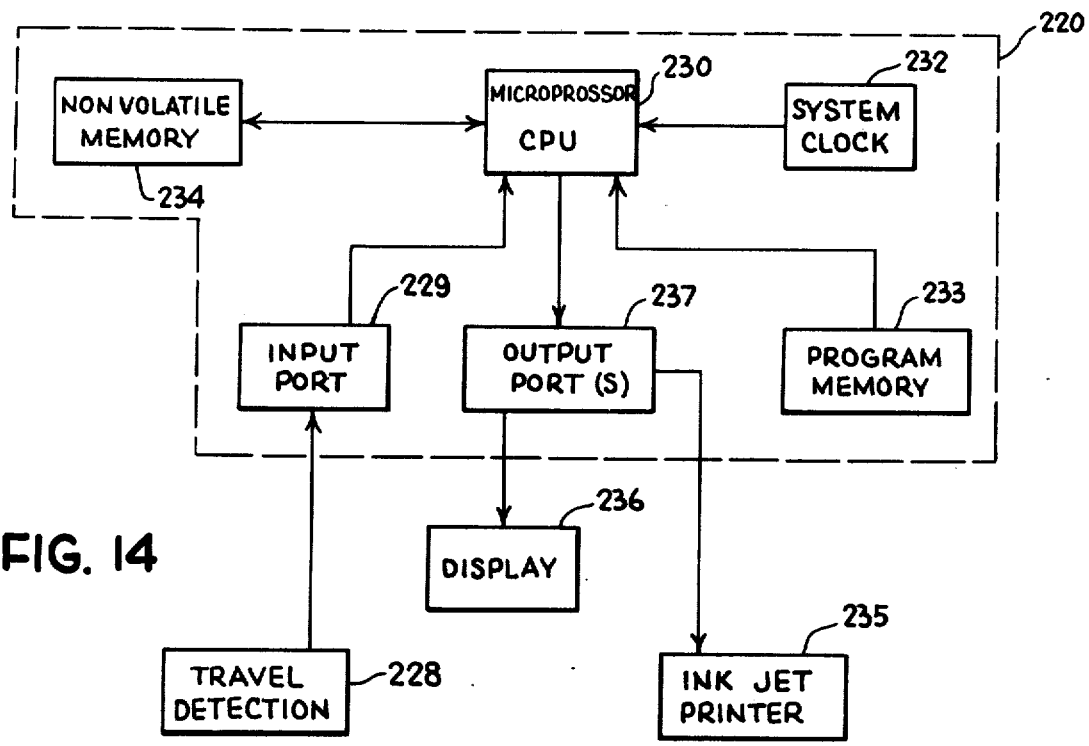
FIG. 14 is a functional block diagram of the microcomputer and display used in the second embodiment.

As shown in simplified form in FIG. 14, microcomputer 220 includes microprocessor circuitry (CPU), program memory circuitry 233, and clock 232 circuits which coordinate the printing device 235 actuation with the signal pulses generated by an encoder wheel or optical monitor 228, coupled to the CPU via the input port circuitry 229, with the relative meter-to-document movement in the same way as microcomputer 72. Microcomputer 220 also incorporates a non-volatile postage memory register 234, for storing purchased amounts of postage. CPU 230 has an added capability not found in CPU 113. In particular, in this second meter embodiment, the CPU 230 is adapted to signal a display 236 via output port circuitry 237, to indicate the amount of postage which remains stored in the meter after each use. This display, which may be a light emitting diode or liquid crystal display, accordingly becomes a visible descending postage register. In the preferred form, the microcomputer 220 is programmed to actuvate the display 236 approximately five seconds after postage indicia has been printed and for a period of five seconds. Thus, the meter user is reminded, after each meter use, of how much postage remains stored therein, and of when more postage should be entered in the memory register.

The microcomputer finally includes a disabling or lock-out function for disabling the meter when postage stored in memory register 234 has been depleted to a predetermined minimum amount.

Figure 14A:
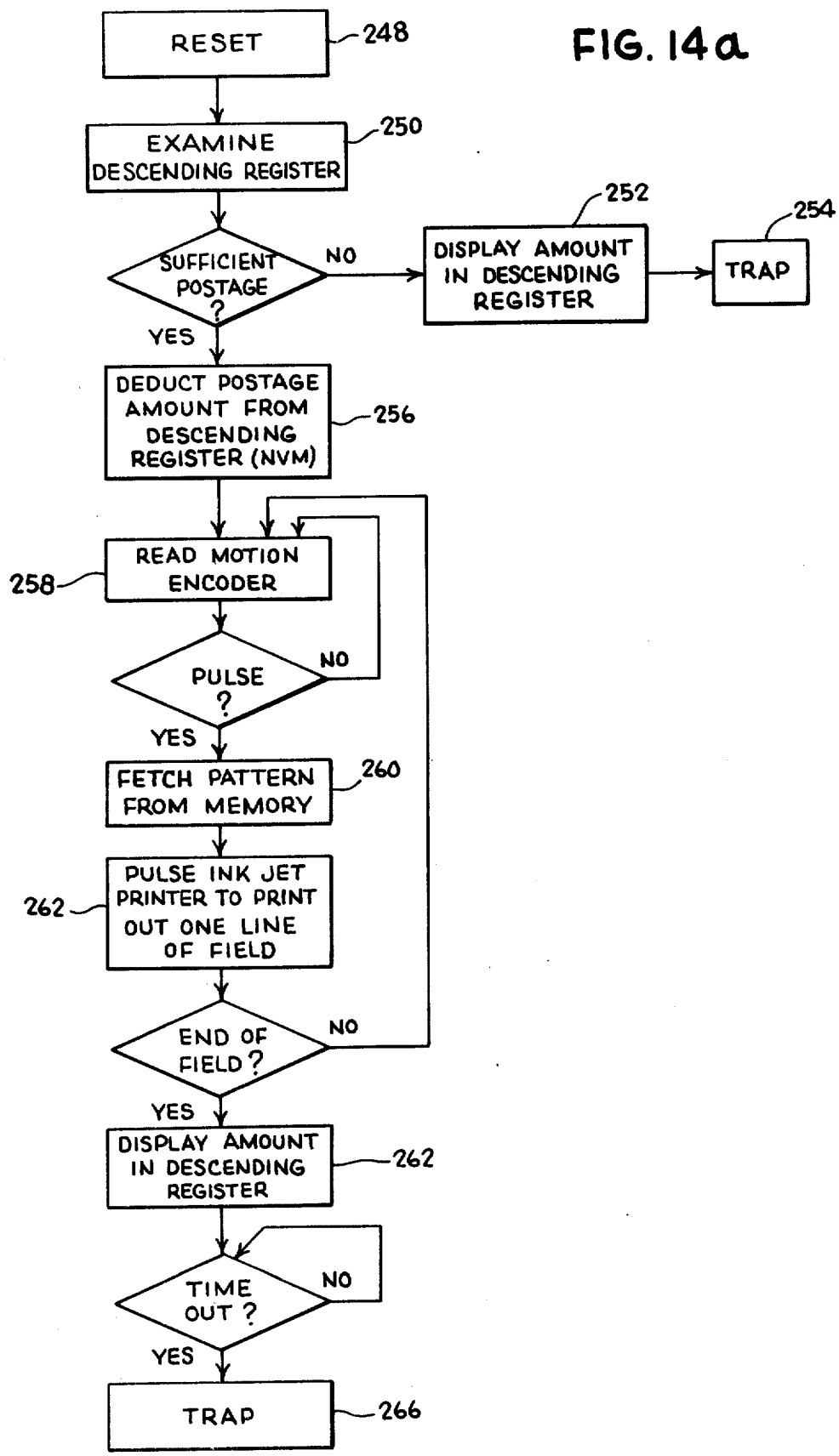
FIG. 14a is a flow chart showing the logic steps performed by the microprocessor and register of the postage meter shown in FIG. 11.

The functioning of microcomputer 220 may best be understood by referring to FIG. 14a which shows the logic steps to accomplish the printing of postage indicia on a document and displaying the amount of remaining postage stored in the memory.

The initial step is the start or reset 248 of the microcomputer which is accomplished by depressing the print button 215, which energizes the microcomputer. The CPU 230 immediately examines the descending register 250 located within the memory 234 to determine if a sufficient amount of postage remains therein to enable the logic steps to continue. If insufficient postage is in the register, the CPU will provide an output voltage to the circuitry 252 energizing the display 236 with the exact amount of postage remaining in the descending register. The CPU enters a loop 254 thus disabling the meter and preventing the ink jet printer from being activated.

Alternatively, if sufficient postage remains in the descending register of the memory 234, the CPU subtracts (deducts) the preset amount of postage 256 to be printed from the descending register. The CPU now determines if a signal pulse is being provided by the travel detector 228, indicating motion 258 of the meter across a document. If no motion pulse is present from the travel detector 228, the CPU waits until a pulse signifying motion across a document is obtained. Once a pulse from the travel detector is present the CPU interrogates the coded dot pattern stored in the program memory 233 and recalls it 260 and writes it out 262 to energize the jet printing device 235 which causes the printing of a single line of field. The logic steps are repeated until the complete field is printed (postage indicia 20), whereby the remaining amount of postage in the register is then displayed 262 on the display 236, and a trapping function 266 is generated disabling the CPU as described earlier, until reset when the print button 215 is depressed again.

The meter 210 constructed in accordance with the second embodiment may be replenished with ink and postage by removing the entire body 212 from the meter components, thus exposing microcomputer input jacks 240 and an ink reservoir filler tube 242. Cable 227 is provided with a loop 244 to permit disengagement of the body from the components. Power supply 226 can be recharged through an exposed input jack 246.

A third embodiment, which functions as both a postage meter and a mathematical calculator is illustrated in FIGS. 15 through 20a. The apparatus 310 of this embodiment is housed in a body 312 having size approximately the same as currently available hand-held calculators, and may include a microcomputer 314 comprised of five integrated circuit chips 316. Each chip is again mounted on a printed circuit board 318.

Microcomputer 314 includes a microprocessor circuit (CPU) 320 (FIG. 20) with increased capacity which actuates a printing device in the form of six staggered, eleven-jet ink jet printers 322 (FIGS. 15, 17, and 18) arranged to print postage indicia from the resulting sixty-six ink droplet array. Each single printer is identical to those described with reference to the first two embodiments of the present invention. However, by arranging a collection of six printers as shown in FIGS. 15 and 18, printing capacity is greatly increased.

As can be seen in FIG. 15, body 312 is formed with a support portion 324 and an elevated portion 326 on its bottom. The ink jet printers are mounted above the elevated portion under which a document may be easily drawn as depicted in FIGS. 18 and 19 to receive printed indicia.

Figure 20:
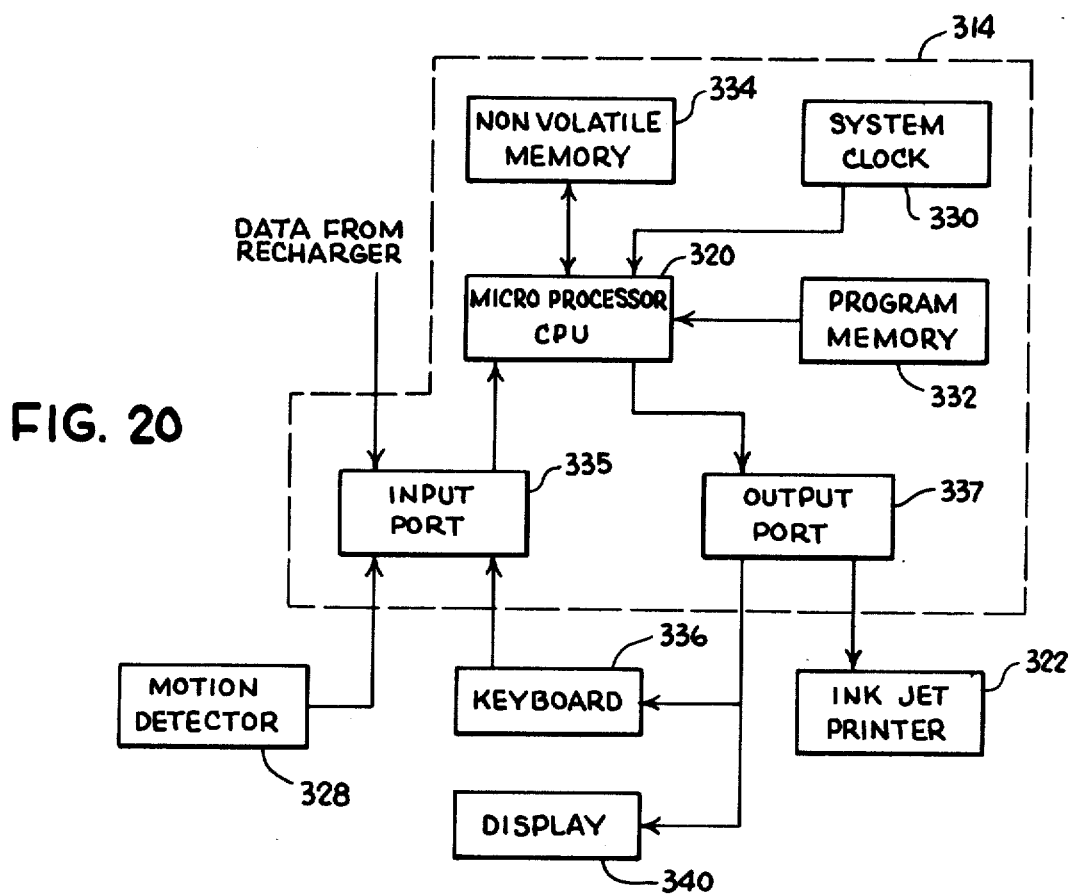
FIG. 20 is a functional block diagram of the combined postage meter calculator apparatus shown in FIG. 15.

It will be appreciated from FIG. 20 that apparatus 310 also includes a motion detector with an encoder wheel as in the first embodiment or may include an optical monitor 328 and that microcomputer 314 also includes a clock circuit 330, a program memory 332, and a non-volatile memory register circuit 334, input port circuitry 335 and output port circuitry 337, all of which function in the same way as do corresponding components described with reference to the first two embodiments. However, the microprocessor circuit 320 is more versatile than the microprocessors (CPU) in either of those embodiments since it may be programmed to actuate the printing device to print varying amounts of postage. An input key board 336 (also shown in FIGS. 15 and 17 through 19) mounted on top of body 312 is provided for entering information and programming instructions into the CPU 320 for this purpose.

Moreover, CPU 320 also includes mathematical logic circuitry which is programmed to perform mathematical calculations. A mode control switch 339 is provided so that the apparatus 310 may be selectively operated through key board 336 in either the postage meter or calculator mode.

The ink jet printing device may be actuated, if so desired, by the CPU 320 to print results of mathematical calculations. However, a display 340, in the form, for example, of a light emitting diode or liquid crystal display, is mounted in the upper portion of body 312 for visually showing these results.

Display 340 may also be connected to the memory register to show the amount of postage stored therein, in the same manner as display 236 of the second embodiment when the apparatus is operated in the postage meter mode.

Power supply and microcomputer input jacks 342 and 344 respectively are made accessible only to the post office from the rear of body 312 (FIG. 16) for recharging a power supply 346 and re-entering postage in memory register 334.

It is also to be noted that the optical monitor may be used to monitor the fact that the printing on the document has indeed occurred and the pulses obtained therefrom may be included in the logic program of any of the embodiments by providing a subprogram therefor in a conventional manner.

Figure 20A:
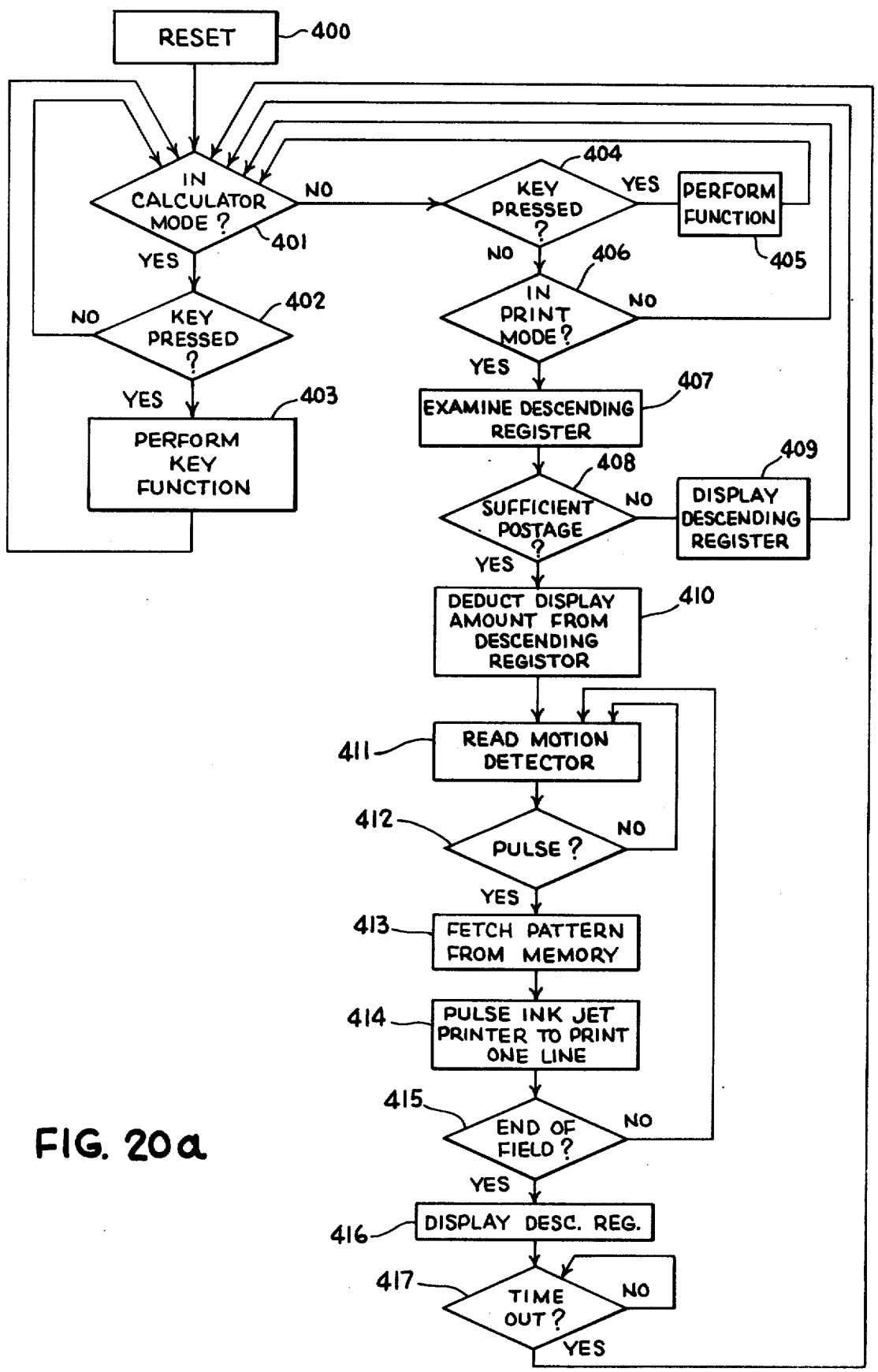
FIG. 20a is a flow chart showing the logic steps performed by the microprocessor and register of the postage meter shown in FIG. 15.

The functioning of microcomputer 314 may best be understood by referring to FIG. 20a which shows the logic steps to accomplish the operation of a microcomputer as a postage meter, as a calculator and the steps required to accomplish the printing of postage indicia on a document.

The initial step is a general reset 400 to the microcomputer system upon application of power to the system. Switch 339 (FIG. 19) is examined to determine if the calculator or postage meter mode is desired 401. If in the calculator mode, the keyboard is examined to determine if any keys are activated 402. If not the program loops back to examining the mode switch 401. If a key is pressed, the program called for by the key 403 is executed before branching back to examining the mode switch. The functions indicated by 403 may include standard calculator functions such as enter number, add, subtract, multiply, divide, as well as special purpose functions that may be of particular use to people using the mails.

If not in the calculator mode, the keyboard is examined to see if any keys are pressed 404. If yes, the function called for by the key is executed 405. These functions may include entering numbers to set up a postage amount to be printed, recalling register amounts into the display and putting postage into the meter with the RMRS system. After performing the function, the program returns to examining the mode switch.

If not in the calculator mode and no keys are operated, a check is made to see if the meter is to print postage 406. If not, the program branches back to examining the mode switch. If the meter is to print postage, the descending register is examined 407 to determine if sufficient postage is available. If not, the amount in the descending register is displayed 409 and a return to the main program made. If sufficient postage is available, the amount to be printed is deducted from the descending register 410, then the motion detector is read 411. If no pulse is detected, the program loops until one occurs 412. Upon arrival of a pulse, the bit pattern to be printed is generated from the amount to be printed and look-up tables in memory 413. This pattern is used to energize the jet printers via output ports to print a selected pattern 414. If the end of the field has not been reached 415, the program loops back to reading the motion detector 411. Upon completing the printing of the postage field, the descending register is displayed 416 for a fixed period of time 417 before branching back to reading the mode switch 401.

The miniature postage meters of the present invention and a central postage distributing station may be used in several novel ways to distribute and dispense postage. In each way, the microcomputer postage memory register of any miniature postage meter is first electrically connected to the central station 122, FIG. 9, i.e. the postage dispensing computer 136 and a predetermined purchased amount of postage is entered therein. The meter may then be distributed to the ultimate postage user by any number of different methods. For example, the postage user may obtain a meter at a post office or store by paying a cash security deposit in addition to purchasing the amount of postage stored in it. He then uses the postage in the meter as necessary in the manner described above. Once the memory register has been depleted of purchased postage, the meter is disabled to prevent further dispensing of postage. It is then returned to the place of purchase from which it is returned to the central postage distributing station. The microcomputer of the meter is again electrically connected to the postage distributing computer and a predetermined amount of postage is entered in the memory register. The cycle of distribution and use is then repeated.

When the meter is returned to the place of purchase by the ultimate postage user, his security deposit is refunded or alternatively, he is given a meter in which postage has been entered in exchange for purchase of the amount of postage. Return may be accomplished by mailing or hand carrying the meter for exchange to the central postage distributing station.

Alternatively, the meter may be sold directly to the ultimate postage user. When he desires to purchase more postage, he merely has to return the meter to a central postage distribution station where an additional amount of purchased postage is entered in its memory register. Reprogramming station consoles may also be set up at locations remote from the central distribution station. In each of these alternative methods, the ink reservoir is refilled and the power supply is recharged when the meter is connected to the central postage distribution station.

The advantages of such a system of postage distribution to both the consumer and to the government can be readily appreciated. The postage consumer is afforded a means of using postage far more convenient than those presently known. Government printing costs for postage would also be greatly reduced.

Although specific embodiment of the microcomputerized, miniature postage meter of the present invention and methods for distributing and dispensing postage using this meter have been described above in detail, it is to be understood that this disclosure is for purposes of illustration. Modifications may be made to the described structures and to the described methods by those skilled in the art in order to adapt these structures and methods to particular applications.

What is claimed is:

1. A microcomputerized, miniature postage meter for printing postage indicia on a document such as an envelope, label, or the like, said postage meter comprising:
    A. printing means including an ink jet printing device adapted to project ink droplets onto the document in a postage indicia forming pattern; and
    B. microcomputer means operatively connected to said printing means, and programmed to actuate said ink jet printing device to project ink droplets onto the document in the postage indicia forming pattern; wherein said microcomputer means comprises:
        a. microprocessor logic means programmed to actuate said ink jet printing device; and
        b. a postage memory register, for storing a purchased amount of postage, addressable by said logic means to reduce the amount of postage stored therein by the amount printed during each meter use.

2. The microcomputerized, miniature postage meter as claimed in claim 1 wherein said microcomputer means is programmed for disabling said postage meter when postage stored in said memory register is depleted to a predetermined minimum amount.

3. The microcomputerized, miniature postage meter as claimed in claim 1 further comprising:
    a display, addressable by said microprocessor, for indicating when a predetermined low amount of postage remains stored in said memory register.

4. The microcomputerized, miniature postage meter as claimed in claim 1 further comprising:

a digital display, addressable by said microprocessor, for indicating the amount of postage which remains stored in said memory register.

5. A microcomputerized, miniature postage meter for printing postage indicia on a document such as an envelope, label, or the like, said postage meter comprising:
   A. printing means mounted in said postage meter, movable in close operative proximity relative to a location on the document where the postage indicia are to be printed,
   B. microprocessor logic means for actuating said printing means to print postage indicia on the document when moved in close operative proximity thereby;
   C. means for ascertaining the distance said printing means is moved in operative proximity relative to the document, and;
   D. means responsive to said distance ascertaining means for signaling said logic means at a rate coordinated to the relative movement of said document to said printing means to thereby form the printed postage indicia.

6. The microcomputerized, miniature postage meter as claimed in claim 5 wherein said printing means comprises:
   an ink jet printing device for projecting a sequence of ink droplets onto said document in a pattern determined by said logic means to define the postage indicia.

7. The microcomputerized, miniature postage meter as claimed in claim 6 wherein said distance ascertaining means comprises:
   means for monitoring the distance said meter has traveled on said document by counting a number of pulses generated by a rotatable disc which is rotatably connected to said postage meter and which is caused to rotate as said postage meter is advanced over the document.

8. The microcomputerized, miniature postage meter as claimed in claim 5 further comprising:
   a postage meter register for storing a purchased amount of postage, said memory register being addressable by said logic microprocessor logic means to reduce the amount of postage stored therein by the amount of postage printed during each meter use.

9. The microcomputerized, miniature postage meter as claimed in claim 8 wherein said microprocessor logic means includes lock-out function means for disabling said postage meter when postage stored in said memeory register is depleted to a predetermined minimum amount.

10. The microcomputerized, miniature postage meter as claimed in claim 8 further comprising:
    a display, addressable by said microprocessor, for indicating when a predetermined amount of postage remains in said memory register.

11. The microcomputerized, miniature postage meter as claimed in claim 8 further comprising:
    a digital display, addressable by said microprocessor, for indicating the amount of postage which remains stored in said memory register.

12. A microcomputerized, miniature postage meter for printing postage indicia on a document such as an envelope, label, or the like, said postage meter comprising:
    A. printing means including an ink jet printing device, mounted to be moved in close operative proximity relative to the document and adapted to project ink droplets onto the document when moved relative thereto;
    B. means for monitoring the relative movement of said printing device and said document; and
    C. a microcomputer including:
       1. processor logic means for sequentially actuating said printing device to project ink droplets onto the document in a programmed pattern to print the postage indicia;
       2. clock circuit means connected to said microprocessor logic means for providing a signal to said logic means to coordinate the actuation of said printing device with the amount of relative movement to properly form the printed postage indicia;
       3. a postage memory register, for storing a purchased amount of postage, addressable by said logic means to reduce the amount of postage stored therein by the amount printed during each meter use; and
       4. a lock-out function means for disabling said postage meter when postage stored in said memory register is depleted to a predetermined minimum amount.

13. The microcomputerized, miniature postage meter as claimed in claim 12 wherein said microcomputer postage memory register is adapted for entry and re-entry of additional purchased postage and wherein said microcomputer further comprises:
    means for resetting said lock-out function means to enable said postage meter to operate when additional postage is re-entered in said memory register.

14. A microcomputerized apparatus for printing postage indicia on a document such as an envelope, label, or the like, and for performing mathematical calculations, said apparatus comprising:
    A. printing means including an ink jet printing device adapted to project ink droplets onto a document,
    B. a microcomputer including;
       1. microprocessor logic means programmed to actuate said printing means to project ink droplets onto a document in a postage indicia forming pattern, said microprocessor further including logic means for performing mathematical calculations,
    C. a keyboard for entering information and programming instructions in said microcomputer microprocessor logic means.

15. The microcomputerized apparatus as claimed in claim 14 further comprising:
    a display for indicating the results of mathematical calculations performed by said microprocessor logic means.

16. The microcomputerized apparatus as claimed in claim 14 wherein said microprocessor logic means is also programmed to actuate said printing means to project ink droplets onto a document in an indicia forming pattern which indicates the results of mathematical calculations performed by said microprocessor logic means.

17. The microcomputerized apparatus as claimed in claim 14 wherein said microcomputer means further includes a postage memory register, for storing a purchased amount of postage, addressable by said microprocessor logic means to reduce the amount of stored postage by the amount printed during each meter use.

18. The microcomputerized apparatus as claimed in claim 17 further comprising a display for indicating the results of mathematical calculations performed by said microprocessor logic means when said apparatus is operated in the calculator mode and for indicating the amount of postage that remains stored in said memory register when said apparatus is operated in the postage meter mode.

19. The microcomputerized apparatus as claimed in claim 14 wherein said printing means is mounted in said apparatus to be moved in operative proximity relative to a document; wherein said ink jet printing device is adapted to sequentially project ink droplets onto the document when moved relative thereto to an indicia forming pattern; wherein said apparatus further comprising:
   means for monitoring the relative movement between said printing means and the document; and wherein said microcomputer further comprises:
   clock circuit means and travel monitoring means connected to said microprocessor for monitoring relative movement of said printing means and the document and for providing a signal to said microprocessor logic means, when said apparatus is operated in the postage meter mode and the calculator mode, to coordinate the actuation of said printing device with the relative movement of the printing means with respect to said document.

20. A postage distributing and dispensing system comprising:
   A. a microcomputerized, miniature postage meter for dispensing postage by printing postage indicia on a document such as an envelope, label, or the like, said postage meter including:
      1. printing means having:
         a. an ink jet printing device adapted to project ink droplets onto a document, and
         b. an ink reservoir for storing ink and supplying ink to said printing device,
      2. a microcomputer comprising:
         a. microprocessor logic means for sequentially actuating said printing device to project ink droplets onto the document in a programmed pattern to print the postage indicia;
         b. a postage memory register, for storing a purchased amount of postage, addressable by said logic means to reduce the amount of postage stored therein by the amount printed during each meter use, said memory register being adapted to have additional purchased postage re-entered in it,
      3. a rechargeable power supply for powering said microcomputer and said printing device; and
      4. jack means electrically connected to said microcomputer and said power supply and in fluid communication with said ink reservoir; and
   B. a central postage distributing station having
      1. an input plug formed to connect with said jack means,
      2. a postage dispensing computer electrically connectable through said input plug and jack means to enter additional purchased postage in said microcomputer memory storage register;
      3. a power supply recharger connectable through said inout plug and jack means to recharge said power supply; and
      4. an ink supply connectable through said input plug and jack means to said ink reservoir to supply ink thereto.

21. A method of printing postage indicia onto a document comprising the steps of:
   programming a postage printing device to print postage indicia of desired form when moved relative to the document,
   moving the printing device relative to the document,
   monitoring the amount of relative document-to-printing device movement, and
   actuating the printing device to print postage indicia on the document in the programmed form at a rate coordinated to the monitored amount of relative document-to-printing device movement.

22. The method of printing postage indicia on a document as claimed on claim 21 wherein the printing device is housed in a hand-held postage meter and wherein said moving step is performed by physically translating the entire postage meter across the document.

23. The method of printing postage indicia on a document as claimed in claim 21 wherein the printing device is housed in a miniature postage meter controlled by a microcomputer and wherein said method further comprises the steps of:
   providing the microcomputer with an input signal indicative of the monitored amount of relative printing device-to-document movement, and
   coordinating the printing with the device-to-document movement by the providing input signal.

24. A method of distributing and dispensing postage comprising the steps of:
   A. entering a predetermined amount of postage in a microcomputer memory register in a hand-held postage meter at a central computer postage distribution station,
   B. distributing the postage meter with the predetermined amount of postage entered therein to be dispensed,
   C. dispensing postage as needed from said memory register by moving the postage meter over documents to be printed with postage until the amount of postage entered therein is depleted to a predetermined minimum amount preset in the memory register and until the postage meter is disabled to prevent further dispensing of postage when the postage entered in the memory register is depleted to the minimum amount preset therein;
   D. electrically connecting the memory register to a central postage distribution station, and
   E. again entering a predetermined amount of postage in the memory register for redistribution of said postage meter.

25. The method of distributing and dispensing postage as claimed in claim 24 wherein the postage meter includes an ink jet printing device, supplied by ink from an ink reservoir, for printing postage indicia on a document such as an envelope, label or the like to thereby perform said dispensing step, wherein the microcomputer memory register and the ink jet printing device are powered by a separately chargeable power supply and wherein said method further comprises the steps of:
   charging the power supply; and
   filling the ink reservoir, said charging and filling steps being performed concurrently with said entering step.

26. The method of distributing and dispensing postage as claimed in claim 24 wherein said distributing step further comprises:
providing a postage meter at a distribution center to a user in exchange for a security deposit, and wherein said method further comprises the steps of:
returning the postage meter to the distribution center, and
refunding the security deposit to the user after said returning step.

27. The method of distributing and dispensing postage as claimed in claim 26 wherein said returning step comprises:
mailing the postage meter to the distribution center.

28. The method of distributing and dispensing postage as claimed in claim 24 wherein said distributing step further comprises:
providing a postage meter, having a memory register in which a predetermined amount of postage is stored, to a user at a distribution station in exchange for at least the cost of the postage plus a meter security deposit; and wherein said method further comprises the steps of:
returning the postage meter to the distribution station after said dispensing step and
providing another postage meter having a memory register in which a predetermined amount of postage to be stored to the user in exchange for at least the cost of the postage.

29. The method of distributing and dispensing postage as claimed in claim 28 wherein said returning step comprises mailing the postage meter to the distribution station and wherein said step of providing another postage meter comprises mailing said other postage meter from the distribution station to the user.

30. The method of distributing and dispensing postage as claimed in claim 24 wherein said distributing step comprises selling said postage meter.

31. The method of distributing and dispensing postage as claimed in claim 24 wherein said entering step is performed at a computer console electrically connected to said central computer but located remotely therefrom.

* * * * *

UNITED STATES PATENT AND TRADEMARK OFFICE
CERTIFICATE OF CORRECTION

PATENT NO. : 4,168,533
DATED : September 18, 1979
INVENTOR(S) : Leon J. Schwartz It is certified that error appears in the above-identified patent and that said Letters Patent are hereby corrected as shown below:

Column 7, line 29, change "pass" to -- mass --.
Column 11, line 6, change "actuate" to -- activate --.
Column 12, line 63, change "therefor" to -- therefore --.
Column 17, line 67, change "inout" to -- input --.

Signed and Sealed this

Sixteenth Day of February 1982

[SEAL]

Attest:

Attesting Officer

GERALD J. MOSSINGHOFF

Commissioner of Patents and Trademarks